United States Patent [19]
Fisher et al.

[11] Patent Number: 5,591,528
[45] Date of Patent: Jan. 7, 1997

[54] VEHICULAR PANEL ASSEMBLY AND METHOD FOR MAKING SAME

[75] Inventors: Daniel J. Fisher; Raj K. Agrawal; Douglas Crank; John W. Carter, all of Holland, Mich.

[73] Assignee: Donnelly Corporation, Holland, Mich.

[21] Appl. No.: 405,966

[22] Filed: Mar. 17, 1995

Related U.S. Application Data

[62] Division of Ser. No. 898,094, Jun. 12, 1992, Pat. No. 5,443,673.

[51] Int. Cl.⁶ ..................................................... B32B 9/04
[52] U.S. Cl. ..................... 428/411.1; 428/34.1; 428/35.2; 428/417; 428/425.6; 428/426; 428/440; 296/201
[58] Field of Search ................................. 428/34.1, 35.2, 428/426, 436, 432, 435, 436, 440, 441, 411.1, 417, 425.6; 296/192, 201; 156/108; 52/746.1

[56] References Cited

U.S. PATENT DOCUMENTS

| | | | |
|---|---|---|---|
| 4,145,509 | 3/1979 | Bhatia | 528/50 |
| 4,169,185 | 9/1979 | Bhatia | 428/328 |
| 5,050,348 | 9/1991 | Kane et al. | 49/351 |
| 5,061,429 | 10/1991 | Yoshihara et al. | 264/252 |
| 5,065,545 | 11/1991 | Kane et al. | 49/375 |
| 5,079,882 | 1/1992 | Bahout | 52/208 |
| 5,090,713 | 2/1992 | Johnson | 277/166 |
| 5,107,623 | 4/1992 | Weil | 49/485 |
| 5,331,784 | 7/1994 | Agrawal et al. | 52/393 |
| 5,352,010 | 10/1994 | Brodie et al. | 296/192 |

Primary Examiner—William A. Krynski
Attorney, Agent, or Firm—Price, Heneveld, Cooper, DeWitt & Litton

[57] ABSTRACT

A panel assembly and method for manufacturing the panel assembly, especially adapted for use in vehicles, includes a panel of predetermined size and geometry wherein a surface of the panel to receive a gasket is primed using a material especially adapted to prepare the panel surface to bond with the gasket. The desired gasket profile is molded separately from the panel from a polymeric material. Following formation of the gasket, the panel is located thereon and pressed into intimate contact with the gasket for a prescribed period of time. The panel and attached panel are removed as an assembly. Additional or optional steps may be followed including preheating the panel and primed surface prior to bonding to shorten the cycle time and improve adhesion. Moreover, heat may be applied to the contact boundary between the panel and gasket substantially simultaneously with the application of pressure. The steps of heating and applying pressure may be repeated to insure proper adhesion. The panel assembly and the method of manufacturing the panel assembly are especially adapted for use in flush mounted panel assemblies wherein the gasket is fixed only to a single surface of the pane and allows for gradationally varying cross-sectional profiles to specifically suit a needed application.

17 Claims, 7 Drawing Sheets

VEHICULAR PANEL ASSEMBLY AND METHOD FOR MAKING SAME

This is a division of application Ser. No. 08/898,094, filed Jun. 12, 1992, now U.S. Pat. No. 5,443,673.

BACKGROUND OF THE INVENTION

This invention relates to panel assemblies especially adapted for use as windows in vehicles buildings or other structures, as well as a method for manufacturing such panel assemblies.

Relatively recent in the history of vehicle panel assemblies, gaskets have been molded or extruded directly onto the window panel. In molded window panels, a sheet of glass is closed within a molding tool and a polymeric material is then injected around the opposing surfaces of the peripheral edge thereby capturing the peripheral edge of the glass panel within the injected polymeric gasket. After the gasket is cured, the mold is opened and the panel assembly is removed. To retain the molded panel assembly within the vehicle, studs or clips may be molded within or attached to the gasket and used to engage the pinch weld flange forming the vehicle opening. Alternately, or in addition, a bead of adhesive is also often applied to bond the glass panel directly to the metal pinch flange. A bezel may be molded with the gasket to decorate and/or conceal space between the vehicle and the window assembly.

New styling requirements are calling for flush-mounted glass panels having an exposed edge. One flush-mounted vehicle panel assembly on the market includes extruded gaskets deposited directly on one surface of a glass sheet. Often the extrusion includes two adhesive beads of polyurethene compounds, one deposited by the panel assembly manufacturer and the other applied by the vehicle assembler. Disadvantages associated with extruded gaskets include long cure time for the first bead, adding cycle time to manufacturing, and constant cross-sectional profiles. In addition to being limited to uniform cross-sectional profiles, the gasket material used in forming extruded gaskets is typically not UV stable by itself and can degrade over time. Moreover, the extrusion does not easily adapt itself to receive mounting studs or clips. The extrusion compound is expensive and requires special storage and handling once formed and cannot be fully completed without creating a seam or gap in the gasket layout.

Another window assembly intended for use in flush-mounted applications had a gasket molded directly to a single surface in a molding machine using reaction injection molded (RIM) urethane. Although this technique offered some variable cross sections, the presence of the glass and tooling limitations prevented or precluded gaskets having undercuts or lips. Other disadvantages include instability when subjected to prolonged exposures of ultraviolet light, long cycle times in forming, and increased material costs compared with other materials such as PVC. In addition, tensile or shear forces applied between the glass and gasket result in failure of the adhesive seal of the gasket with the panel as opposed to the desired loss of cohesion in the gasket itself.

None of the prior panel assemblies or methods are as versatile in providing flush mounted panel gaskets having unique cross-sectional profiles, with or without attaching or otherwise capturing fasteners. Moreover, none of the prior methods or panel assemblies can provide flush-mounted panel gaskets having cross-sectional profiles which are variable along the panel assembly and satisfy complex sealing requirements.

SUMMARY OF THE INVENTION

Accordingly, the present invention includes a unique panel assembly, especially for vehicles having a gasket formed on a single surface for use in flush-mounted panels, and a method for making the panel assembly. Moreover, this invention provides new and unique gasket cross sections having special applications in both fixed and movable panel assemblies which could not previously be obtained using conventional molding processes.

The method for manufacturing the panel assembly, especially adapted for use in vehicle windows, includes the steps of priming a surface of the panel adapted to receive the gasket using a material especially adapted to prepare the glass surface to bond with the gasket. The desired gasket profile is formed from a polymeric material in a mold separately from the glass panel. Once the gasket is formed, the glass panel is appropriately located with respect to the gasket while in the mold and pressed into contact with the bonding surface of the gasket to promote adhesion. The glass panel and attached gasket are then forwarded on as a finished product.

In a preferred form of the method, the panel is preheated after receiving the primer to drive off any carriers/solvents and elevate the energy level of the bonding agents present in the primer. Substantially simultaneously with the step of pressing the preheated panel into contact with the gasket, additional heat energy is applied to the contact boundary between the panel and gasket in order to further the bonding process. The heat energy may be applied using any one of a number of sources, although focused infrared radiation is preferred.

As an alternate form of the invention, or in addition to the steps outlined above, once the gasket is bonded to the panel to form the panel assembly, it may be subjected to a final compressive force and/or radiation treatment. The assembly may be located in a separate fixture where the panel is again forced against the contact surface of the gasket. Radiant or other energy is focused to heat the contact boundary. The primer, activated by the application of heat and pressure up to as long as 30 seconds, is energized to a state to chemically bond with the gasket.

In another form of the invention, preheating of the panel may be reduced or eliminated by applying the primer to the gasket surface after being formed. Moreover, if preheating is desired, heat may be applied to the panel from one or both sides.

The method of this invention is preferred in the manufacture of a panel assembly especially adapted for use in vehicles. More particularly, the method is used to manufacture window panel assemblies for vehicles wherein the glass panel is held within the vehicle by one or more gaskets bonded to a single surface of the panel.

The panel assembly manufactured by the above process includes a sheet-like panel having at least one surface area coated with a heat activated primer. A gasket having a body supported by at least one securing surface is formed separately from the sheet-like panel. The securing surface(s) of the gasket are urged into contact with the primed surface of the panel while still retaining a portion of heat generated during the formation process. The remnant heat in the gasket activates the primer to bond with the gasket. The resulting product or panel assembly is a sheet-like panel having a gasket securely attached to at least a portion of at least one surface.

In an alternate embodiment of the panel assembly, the preformed gasket may have a variety of cross-sectional profiles and each of these may change in size along the gasket to meet very specific applications. An arciform gasket may be made according to the method and have one or more securing surfaces or flanges in contact with the panel. The arciform, curved body may include a gas-filled cavity wherein one wall of the cavity is formed by the panel. The cavity may be sealed or perforated to provide an appropriate seal for the application.

In another embodiment of the panel assembly, the gasket may have a lip or flap which extends beyond the peripheral edge of the panel to form a flexible, resilient seal with the vehicle body.

In yet another embodiment of the panel assembly, one securing flange or surface of the gasket may be enlarged, adapted to capture a mounting stud or locating device inserted in the gasket forming process and adapted to locate or retain the panel assembly in the vehicle.

As will be understood from the invention, numerous advantages for panel assemblies and the methods of making the same are provided by this invention. These include manufacturing simplification by eliminating the need for complex molding tools machined to a fine tolerance to accept curved, sheet-like glass or other panels. The inventive method provides a significantly better manufacturing consistency and tolerance for fitting the gaskets to the sheet-like panels over prior known single sided, extruded or other techniques. Moreover, the method provides panel assemblies having a continuous gasket wherein the cross-sectional profile and/or size of the profile may vary continuously along the length of the gasket. Alternately, separate gaskets, each of a different shape or size may be applied to separate surfaces of the panel, or to separate areas of the same panel surface. This unique ability to change the shape of the gasket for a given portion of the window provides the optimum amount of gasket to seal the window in the opening wherein the prior constant profile gaskets provided either too much or not enough gasket to seal the opening. Furthermore, this method allows strong, secure attachment of the gasket to a single side of the sheet-like panel so that the exterior surface of the panel assembly is substantially flush with the exterior sheet metal portion of the vehicle body.

The panel assemblies manufactured according to the above method have advantages in that the gasket on the panel may be specifically formed to provide a specific function which changes around the perimeter of the window panel. The panel assembly requires less material than prior known fully encapsulated panel assemblies, thus resulting in a less costly product. Moreover, because of the lower pressures required to bond the gasket to the sheet-like panel, fewer panels are broken during the manufacturing process. Yet another advantage of the instant invention is the ability to place the panel assembly in existing vehicles with varied and/or more complex gasket designs for sealing the panel assembly in the vehicle.

Further benefits and advantages of the invention are the ability to form gaskets for panels that could not be made using traditional molding or extruding techniques. These include unusual cross sections such as bulb seals and lip seals having the ability to contain various attachment devices, while providing a flush mounting arrangement of the panel exterior. The method and panel assemblies of this invention have particular applications in Class "A" window panels for use in vehicle windshields, gaskets on laminated panels, and panel assemblies for movable windows.

These and other objects, advantages, purposes and features of the invention will become more apparent from a study of the following description taken in conjunction with the drawing figures described below.

DETAILED DESCRIPTION OF THE PREFERRED EMBODIMENTS

Figure 1:
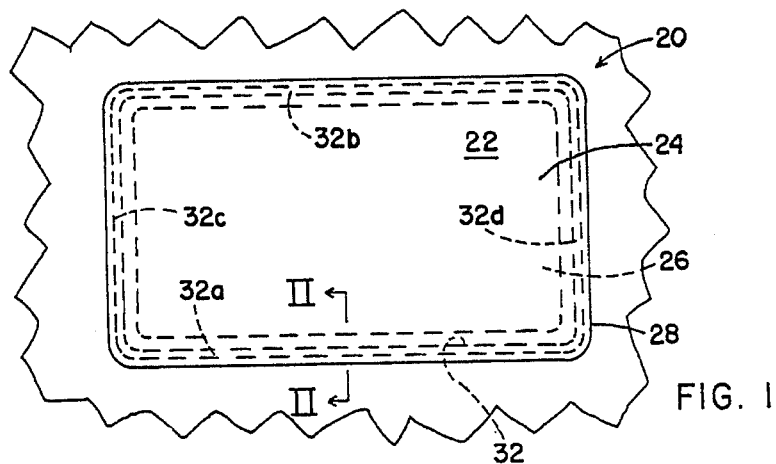
FIG. 1 is a fragmentary view of a panel assembly of the invention mounted in a vehicle opening.
Figure 2:
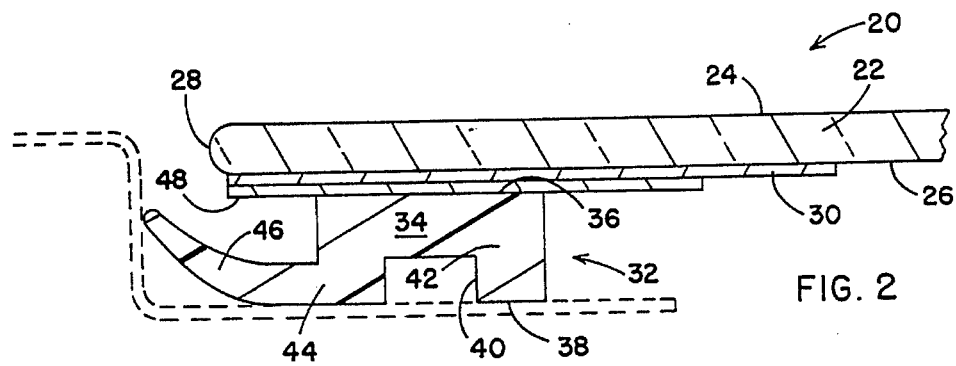
FIG. 2 is a fragmentary sectional view of the panel assembly taken along lines II—II.

Referring now to the drawings, like reference numerals may be used in each of the figures to indicate like components, wherein FIGS. 1 and 2 illustrate one embodiment 20 of the window panel assembly of the present invention. Assembly 20 is specifically adapted for use as a vehicle window and includes a panel or sheet 22 of transparent glass which may be tempered, laminated or otherwise strengthened with conventional techniques/principles. Sheet 22 has two substantially parallel sides or faces 24, 26 which terminate at a peripheral edge 28. Although transparent glass is preferred, other panel materials such as opaque or coated glass, or transparent, coated or opaque plastic materials, or multi-composite laminates such as transparent glass and plastic could also be used. Sheet 22 may also include an opaque, and preferably black ceramic frit layer or coating 30 applied and adhered to one surface such as 26 covering and concealing an area adjacent peripheral edge 28.

Fixed to surface 26 and/or ceramic frit layer 30, and extending along and around at least a portion of sheet 22 proximate peripheral edge 28, is a flexible, resilient gasket or grommet 32 intended to provide a weather seal with a portion of a vehicle body when assembly 20 is installed. In FIG. 1, gasket 32 is shown to extend around the entire perimeter of surface 26.

In FIG. 2, gasket 32 includes a body 34 having a generally rectangular cross section defining a first surface 36 disposed toward sheet 22. Although surface 36 may be substantially smooth, it may contain an irregular or patterned texture to provide a greater surface area to bond to frit layer 30. An opposite surface 38 is shown to include a rectangular channel 40 extending along the length thereof. Channel 40, in turn, defines first and second flanges 42, 44 on either side thereof and which run adjacent channel 40. Running the length of gasket 32 and extending laterally from flange 44 is a resilient, flexible lip seal 46. Seal 46 is generally arcuate, having a radius located toward sheet 22, and terminating beyond peripheral edge 28. Gasket 32 is shown with surface 36 engaging and bonded by primer adhesive 48 to frit layer 30 deposited on sheet surface 26.

The size and/or thickness of body 34 and seal 46 may vary depending upon the gap to be closed, and the sealing force necessary in the vehicle after installation along a given length of the gasket. For example, gasket portion 32A (FIG. 1) may have a high profile while gasket portion 32B at the opposite side of panel 22 may have a low profile. Gasket portions 32C and 32D may have gradational profiles decreasing in size from portion 32A to portion 32B. As will also become more apparent below, a panel such as panel 22 may have a gasket with more than one cross-sectional profile, or may have separate gasket portions of the same or differing size, thickness and/or profile.

Although gasket or grommet 32 may be made using a variety of techniques, including liquid or slurry molds, and compression molding, the preferred technique is injection molding using a polymeric thermoplastic material such as polyvinyl chloride (PVC). However, other molding materials can also be used with the above methods including reaction injection molded (RIM) urethane and thermoplastic elastomers such as thermoplastic rubber (TPR), thermoplastic urethane (TPU) and thermoplastic olefin (TPO).

FIGS. 3A–3D schematically illustrate one embodiment of the inventive method. Sheet 22 may be conveyed to a preparation area where one surface such as peripheral area 26 near edge 28 may be cleaned with a solvent such as methylethylketone to remove oils, dirt or other debris which may interfere with the bonding process. A coating 48 of primer material is applied to surface 26 and/or frit layer 30 to prepare the panel surface to receive gasket 32. The primer is selected to enhance the adhesion bond between gasket 32 and sheet surface 26 and/or frit layer 30 and may be any of several varieties depending on the material of gasket 32 and sheet 22 such as heat and/or pressure activated compositions. The primer may be applied by brush, pad, roller or spray and be allowed to wholly or partially dry to obtain a substantially uniform, even and aerially restricted primer coating. A preferred primer for PVC gaskets is sold under the designation A-1100-B combined with an adhesion promoter designated A-1167-B and produced by B. F. Goodrich Co. of Akron, Ohio.

Substantially simultaneously with the preparation of sheet 22, gasket 32 is formed, preferably using conventional injection molding techniques. As shown schematically in FIG. 3b, one such tool 50 includes an upper mold half 62 having a channel 58. Tool 50 also includes a lower mold half 52 having channels 54, 56 for forming flanges 42, 44 and the outer radius of lip seal 46. Channel 58 and ridge 60, formed in upper mold half 62, and channels 54, 56 in lower mold half 52 combine to form a mold cavity 64 in which body 34 and lip seal 46 of gasket 32 are defined and molded. Preferably, molding is carried out with polyvinyl chloride (PVC) such as 48562 available from Vista Chemical Co. of Aberdine, Miss. If a mold release agent is used, the agent should be cleaned from the gasket before adhering it to the panel. If not cleaned, the mold release agent may inhibit the bonding of the gasket to any other material such as panel 22.

Following the forming of gasket 32, one-half of tool 50, such as 62, is removed leaving gasket 32 within mold half 52. Because gasket 32 is formed by cooperating tool halves 52 and 62, surface 36 has a positive relief with respect to surface 66 of tool half 52 when opened. Gasket 32 may be retained within mold half 52 using a variety of techniques, including mold undercuts, protrusions, core pins and the like, none of which are shown.

Figure 3A:
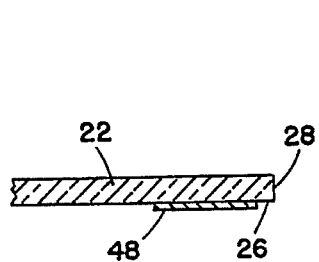
FIGS. 3a–3d schematically illustrate one embodiment of the method of this invention.
Figure 3B:
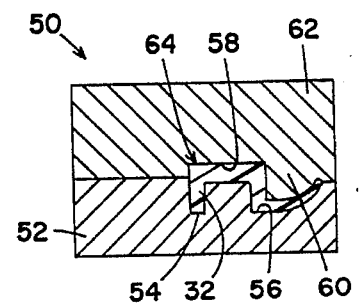
Figure 3C:
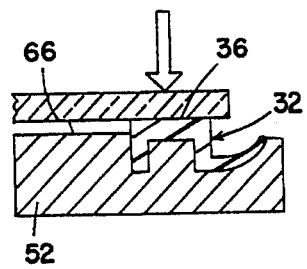
Figure 3D:
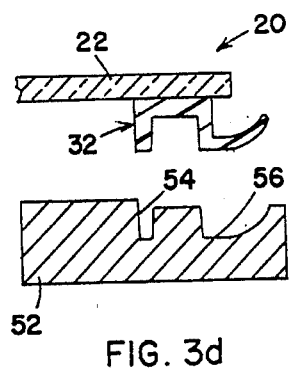

With gasket 32 held by mold half 52, molding tool 50 may be opened. Sheet 22 is removed from preparation area and precisely located on gasket 32 with locating pins, templates, guides or the like to place primed surface 48 into contact with surface 36 (FIG. 3C). Because gasket 32 is still hot from the molding process (between 100° and 300° F.), gasket 32 activates primer 48 to bond gasket 32 with surface 26 and/or frit layer 30. The bond is improved by pressing sheet 22 against surface 36, insuring an optimum surface area is in uniform, complete contact with the primed surface 48. After a predetermined period of time (between 3 and 20 seconds) allowing gasket 32 to bond with and cure on sheet 22, the panel 22 and attached gasket 32 are removed from lower tool half 52 as panel assembly 20 (FIG. 3d) and moved on as a finished product where it is packaged for shipping.

The above process, using the remnant heat of the injection molding process, together with the compression of sheet 22 against surface 36, may be sufficient to form a strong, bond adhering gasket 32 to sheet 22. A variety of devices may be used in locating sheet 22 on gasket 32 including the use of locating pins, and/or guided robotic arms (not shown) having the ability to precisely locate each panel.

Figure 4A:
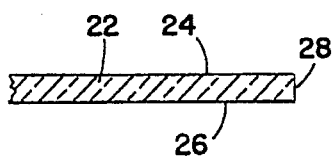
FIGS. 4a–4j schematically illustrate a preferred embodiment of the method and panel assembly of this invention.
Figure 4B:
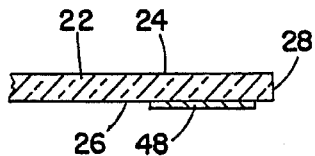
Figure 4C:
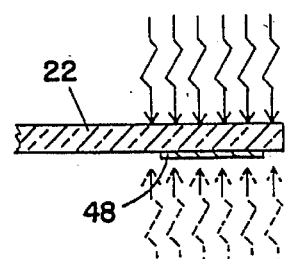
Figure 4D:
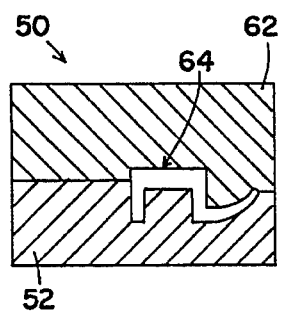
Figure 4E:
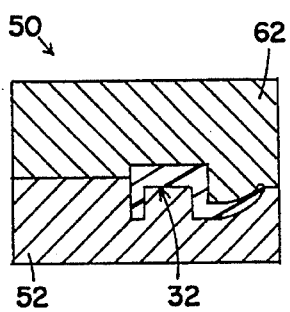

Although the above procedure described in reference to FIGS. 3A–3D bonds gasket 32 to surface 26 and/or frit layer 30 of sheet 22, it is preferred that certain additional and/or optional steps be performed to further improve the strength of the bond between gasket 32 and sheet 22. Referring to FIGS. 4A–4J, a preferred method for making panel assembly 20 includes obtaining a sheet or panel 22, preferably of glass and of predetermined geometry, to receive gasket 32. Panel 22 may include a ceramic frit coating 30 (FIG. 2) deposited on at least one surface such as 26 proximate peripheral edge 28. Once the appropriate sheet 22 is selected, the perimeter of surface 26 and frit layer 30 adapted to receive gasket 32 may be cleaned using any one of a variety of procedures to provide a clean bonding surface. As briefly mentioned above, a solvent such as methylethylketone may be applied to surface 26 and frit layer 30 to remove any oil or other debris which might inhibit bonding. A primer coating 48 is applied to that portion of sheet 22 and frit layer 30 to receive the gasket. For certain types of sheets 22 without a cosmetic frit coating, primer coating 48 may be applied directly to t e sheet. Primer coating 48 may be applied to sheet 22 in a spray, by a pad, brush or roller. With sheet 22 prepared, it is preheated to drive off any remaining carriers/solvents and raise the temperature of primer coating 48 and frit layer 30 to between 150° and 350° F. (FIG. 4C). The energy necessary to heat frit layer 30 and primer 48 may be generated by a number of sources and directed into the frit layer in a variety of directions, the details of which are explained more fully below.

Figure 4F:
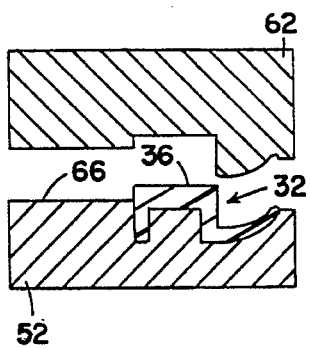
Figure 4G:
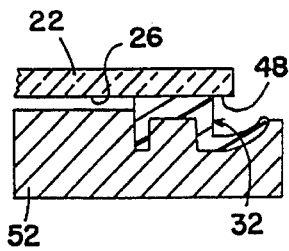
Figure 4H:
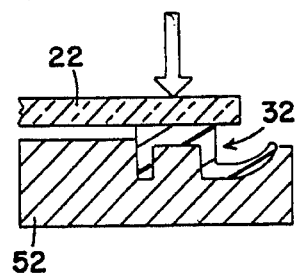
Figure 4I:
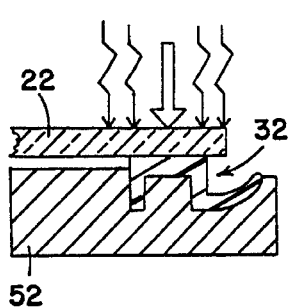
Figure 4J:
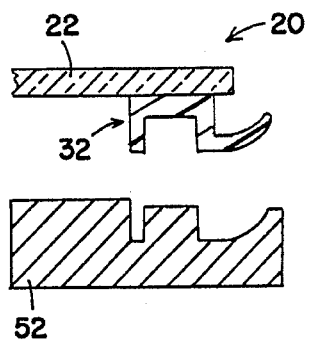

Gasket 32 is formed substantially simultaneously with the preheating of sheet 22. Tool cavity 64 (FIG. 4D) formed by tool halves 52, 62 is injected with a polymeric material such as PVC (FIG. 4E) as described above. After a predetermined period of time sufficient for gasket 32 within tool 50 to substantially cure, set up or harden, halves 52, 62 are separated so that surface 36 extends above upper surface 66 of lower tool half 52 (FIG. 4F).

After tool 50 is opened, exposing surface 36 of gasket 32, and before gasket 32 substantially cools down, heated sheet 22 is precisely located on gasket 32 still retained by tool half 52 using locating pins, templates, guides or the like. Surface 26 and primer coating 48 are urged against surface 36 for a predetermined period of time between 3 and 30 seconds. The force used to urge sheet 22 against surface 36 of gasket 32 should be sufficient to assure that substantially all of surface 36 is in uniform contact with primed surface 48 and bonded therewith. The amount of pressure required to optimize the contact between sheet 22 and surface 36 is dependent upon several factors, including the total surface area of surface 36 in contact with sheet 22, the size and geometric shape of sheet 22, the temperature of gasket 32 and sheet 22, and the exact nature of the material forming gasket 32. For example, for a substantially flat glass sheet 4 millimeters thick, having a surface area of approximately 1 square meter, and a 85 Durometer (Shore A) PVC gasket extending substantially around the perimeter of the sheet with a one inch wide bonding surface 36, the pressure required to affect a secure bond is between one-half and five atmospheres or approximately 7 to 75 pounds per square inch (psi).

Substantially simultaneously with the forcing of sheet 22 against surface 36 of gasket 32, a radiant or electromagnetic energy is applied for approximately 3 to 30 seconds to frit coating 30 between surface 36, primer coating 48 and surface 26 of sheet 22. Preferably, infrared energy is focused using a CFIR heat source, described below, to have the maximum effect on frit layer 30. Depending upon the materials used to form gasket 32, and the temperature of sheet 22 and gasket 32, the time required to maintain sheet 2 against surface 36 (FIGS. 4H, 4I) will vary. For PVC and A-1100-B primer mixture described above, it is contemplated that a pressure of approximately 14 psi and heat raising the temperature to approximately 300° F. may be applied approximately between 3 and 30 seconds. Following the application of pressure and heat for the predetermined period of time, the bond between gasket 32 and sheet 22 should be optimum. At this point, panel assembly 20, including sheet 22 and bonded gasket 32, may be removed from lower tool 52 (FIG. 4J) and moved on as finished goods.

Figure 5A:
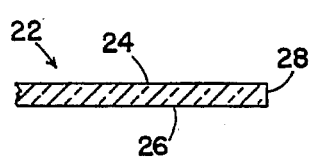
FIGS. 5a–5k schematically illustrate an alternate embodiment of the method and panel assembly of this invention.
Figure 5B:
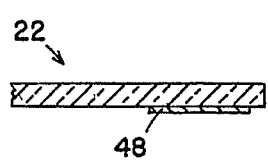
Figure 5C:
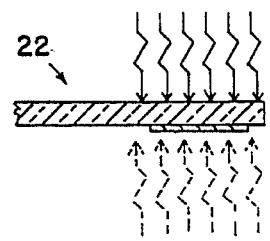
Figure 5D:
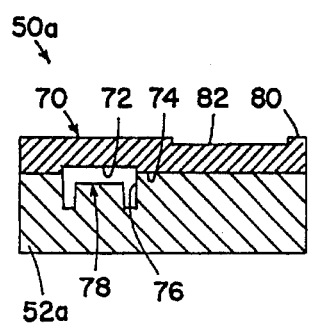
Figure 5E:
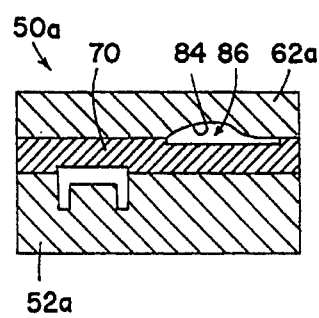
Figure 5F:
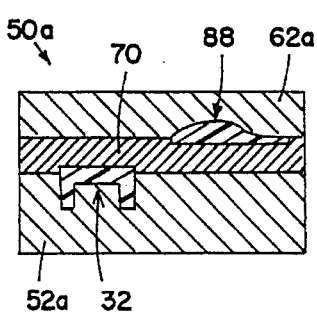

In an alternate embodiment of the invention (FIGS. 5A–5K), two gaskets adapted to be adhered to opposite portions of panel 22 are formed simultaneously. Tool 50a is adapted to receive an insert 70 having a recess or channel 72 on one surface 74 adapted to fit in registered alignment with groove or channel 76 in tool half 52a combining to form a tool cavity 78 (FIG. 5D) to form one gasket 32. An opposite surface 80 of insert 70 contains a channel 82 which fits in registered alignment with a contoured channel 84 defined in tool half 62a to form cavity 86 (FIG. 5E) to form a seal or second gasket 88. Again, a mold release material may be applied to the surfaces of insert 70, as well as channels 76, 84 to prevent the formed gaskets 32, 88 from sticking. This may be particularly true to the surfaces of the insert forming portions of the mold cavities. With tool halves 52a and 62a closed about insert 70, polymeric material, such as PVC, is injected into each cavity 78, 86 to form first gasket 32 and second gasket or trim piece 88 (FIG. 5F).

Figure 5G:
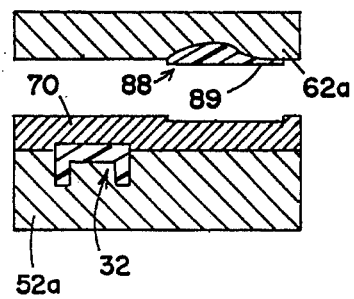
Figure 5H:
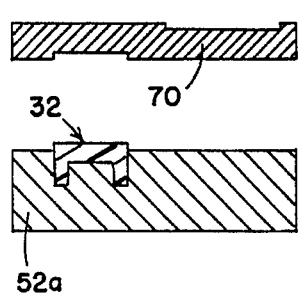
Figure 5I:
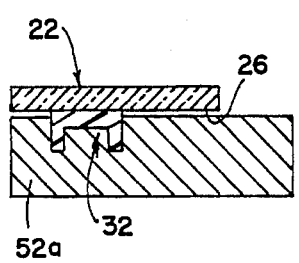
Figure 5J:
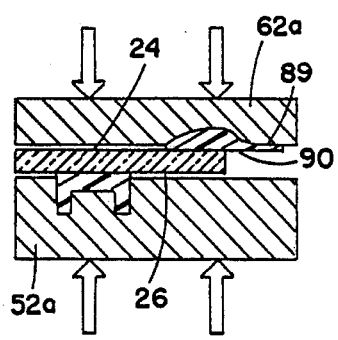
Figure 5K:
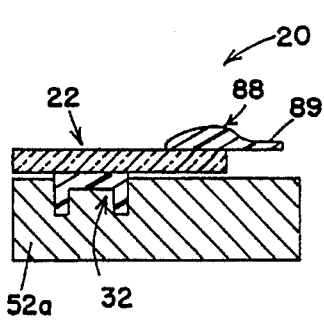

With gasket 32 and trim piece 88 substantially cured or hardened, but still retaining heat produced during the molding process, tool 50a is opened retaining trim piece 88 in tool half 62a, and gasket 32 retained in tool half 52a (FIGS. 5G–5H). If a mold release agent is used, mechanical means may be used to retain the gaskets in their respective mold halves 52a, 62a such as pins, undercuts in the channels, or by a vacuum. Without the mold release agent, each gasket should stay in the channel in each mold half 52a, 62a without the above structures. With each gasket and/or seal held by tool halves 52a, 62a, insert 70 is removed (FIG. 5H) and heated sheet 22 is precisely located by pins or other mechanisms on gasket 32 contained in tool half 52a (FIG. 5I). As in the previous embodiment, sheet 22 is located so that primed surface 26 engages surface 36 of the gasket. With sheet 22 properly located on gasket 32, tool half 62a, retaining trim piece 88, is closed placing surface 90 of trim piece 88 into intimate contact with surface 24 (FIG. 5J). Preferably, surface 24 which will contact surface 90 of trim piece 88 has been previously primed in the same manner as surface 26. Trim piece 88 is positioned on sheet 22 by tool half 62a such that a resilient, flexible lip 89 extends beyond the peripheral edge of sheet 22 to form a weather or lip seal. It is preferred that surfaces 36, 90 of gasket 32 and trim piece 88, respectively, be urged into intimate contact with surfaces 24, 26 of sheet 22 by closing tool 50a to assure completion of the bond over the maximum possible surface area. At this time, heat may be applied to raise the temperature of the bonding surface or contact between each polymeric element 32, 88 and sheet 22 using one of a variety of sources including conduction, induction, radiation and/or convection. As in the previous embodiment, the pressure and temperature ranges may vary depending upon the size and geometry of the panel, the gasket material used, the temperature of the gasket and/or sheet, and the surface area of the gasket to contact the panel. It is contemplated that the ranges specified above vary somewhat depending on the specific application. Following the application of pressure and optional heat (approximately between 3 to 30 seconds) the heat and pressure are removed and the finished assembly is removed and forwarded as finished goods (FIG. 5K).

Figure 6A:
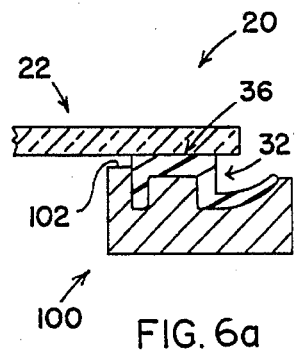
FIGS. 6a–6e schematically illustrate yet another embodiment of the method.
Figure 6B:
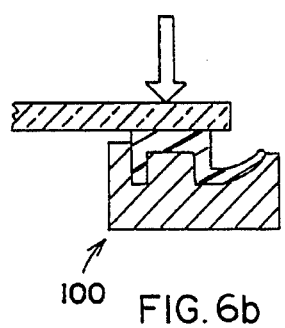
Figure 6C:
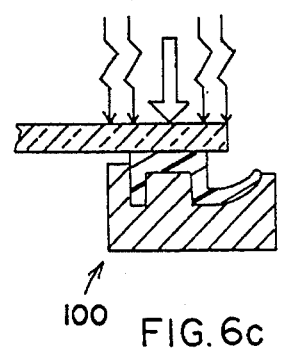
Figure 6D:
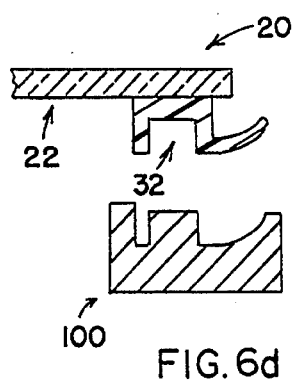
Figure 6E:
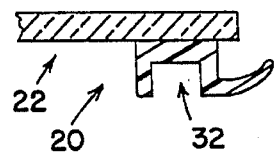
Figure 11:
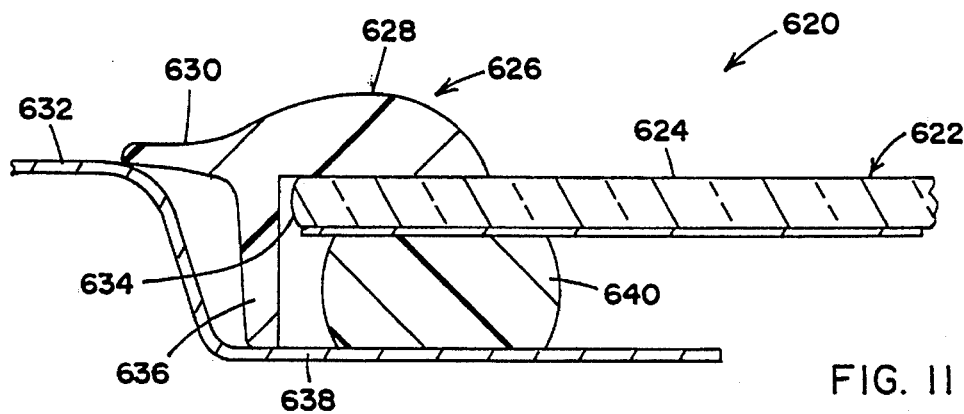
FIG. 11 is a fragmentary section view of one embodiment of a class "A" panel assembly made in accordance with the inventive method.

In addition to the steps outlined above, or if it is found to be impractical to apply heat to the contact surface between the premolded polymeric material and sheet 22 while in tool 50a, or it is found to be undesirable the heat and/or pressure may be applied in a separate fixture. In an alternative to the steps outlined above, or in addition thereto, the steps illustrated by FIGS. 6A–6E may be followed. It shall be assumed, for the purposes of this discussion, that some or all of the above steps have been completed to initially bond gasket 32 and/or trim piece 88 to sheet 22 to form panel assembly 20. Panel assembly 20 may be moved to a separate fixture, such as 100, having a profiled recess adapted to receive and seat gasket 32, such that surface 36 has a positive relief with respect to surface 102 (FIG. 6A). Sheet 22 may again be forced into intimate contact against surface 36 (FIG. 6B). Substantially simultaneously with the application of pressure, energy may also be directed onto or through sheet 22 to heat frit layer 30 or contact boundary 90 between gasket 32 (or trim piece 88) and sheet 22. The source of the energy may again constitute or include the various sources described below with respect to FIGS. 11 and 12. The application of pressure and heat is maintained for the desired number of seconds to assure a complete and secure bond of gasket surface such as 36 with sheet 22 (FIG. 6C). Following this step, panel assembly 20 is removed from fixture 100 and is prepared for packaging (FIGS. 6D and 6E).

Although the application of heat has been described with respect to the use of infrared or electromagnetic energy sources, heat may also be applied by several other sources including conduction, convection, induction and radiation sources. Similarly, the pressure or force necessary to urge panel 22 against gasket 32 may be achieved in an autoclave or by the weight of the individual panel on the gasket.

In operation, assuming a substantially flat, rectangular panel 4 feet wide by 2¼ feet high and 4 millimeters thick, the perimeter of one surface of the sheet may be cleaned, as described above, to remove any debris or other material which may inhibit bonding. A coating of the primer A-1100-B and promoter A-1167-B mixture made by B. F. Goodrich Co. of Akron, Ohio, is applied in a substantially even coat to the outer 4 inches of the perimeter. The primer may be applied directly to a ceramic frit coating such as 30 shown in FIG. 2, using the frit coating as a gauge for the distribution of the primer. Once the primer is applied, the frit layer and/or sheet is preheated using one of the energy sources described below. It is preferred that the energy generated by the source be absorbed by and heat the ceramic frit layer, drying the primer by driving off any remaining solvents therein, as well as heat the surface of the panel adapted to receive the gasket.

substantially simultaneously with the preparation and preheating of the panel, one or more gaskets of pre-determined shape and profile are formed in the molding tool, as described above. The preferred method of forming the gasket is injection molding using PVC. A preferred PVC is that made by Vista Chemical Co. described above. The heated PVC material is injected into a mold cavity formed by the mold halves pressed tightly together. The hot PVC, together with the pressure used to inject the PVC into the mold, increases the temperature level of the PVC to about 385° F. The gasket is allowed to harden or cure to the shape defined by the mold. Less than one minute later, the mold is opened and the heated sheet is located on the newly formed gasket which has cooled to a temperature of approximately 125° F. A pressure of approximately 7 to 70 psi is applied to the panel and gasket to press the two together. The application of the pressure, together with the residual heat retained by both the gasket and the panel, activates the primer on the bonding surface. The heat activated primer interacts with the PVC material of the gasket, bonding the gasket to the sheet or frit layer. Additional heat is introduced to the frit layer preferably by directing energy through the sheet on a side opposite to that of the gasket using a controlled, focused infrared energy source described below. The added heat further increases the activation level of the primer with the gasket and improves adhesion. Although both heat and pressure do not need to be applied simultaneously, it is preferred that both be applied for between 3 and 30 seconds. After that time, the heat and pressure are withdrawn and the contact between the panel and the gasket is allowed to cool for approximately 10 to 15 seconds. After cooling, the glass panel and bonded gasket forming the panel assembly, are moved on in the assembly process as finished goods.

For example, a one-eighth inch thick sheet of glass nine inches square including a frit layer on one surface had a PVC gasket bonded thereto similar in cross section to that shown in FIG. 2 and having a one inch wide bonding surface. The gasket was molded using injection molding techniques in a 250 ton press using 200 tons of clamping pressure. The PVC melt temperature was 380° F. and had a nine second cure time in the mold. While the gasket was being formed, the glass sheet was locally heated to 300° F. After the gasket was formed, the mold was opened and the 300° F. panel was located with respect to the gasket which had cooled to approximately 125° F. A force of 14 psi was applied for approximately 7 seconds, forcing the panel and gasket against each other. Simultaneously with the application of the force, the frit layer was heated using a focused infrared source described below.

Figure 7:
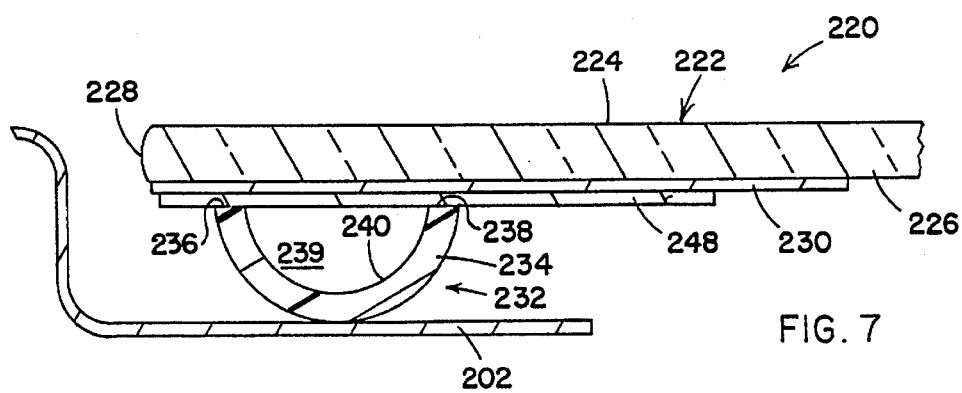
FIG. 7 is a fragmentary section view of yet another embodiment of a panel assembly that may be used in FIG. 1.

FIGS. 7–10 illustrate different embodiments of gasket or grommets manufactured by any one of the methods outlined above and specifically adapted for use in flush-mounted panel assemblies. In FIG. 7, assembly 220 includes a sheet-like panel 222 having opposite surfaces 224, 226 terminating in a peripheral edge 228. Surface 226 includes a ceramic frit coating 230 which is bonded to a profiled gasket 232 by a primer coating 248. Profiled gasket 232, in this embodiment, is made from a modified PVC blend or other material having favorable compression set properties, and includes an arciform, curved body 234 of generally uniform thickness terminating laterally in securing surfaces 236, 238 which are bonded by primer 248. One example of gasket material is a TPR such as Shell Kraton G-7430 produced by Shell Chemical Co. of Houston, Tex. Although body 234 and surfaces 236, 238 may have the same thickness, it is contemplated that body 234 may have a wall thickness which is gradational or different from that of surfaces 236, 238. Moreover, the thickness or width of each surface 236, 238 may be different from each other as will become readily apparent below. Bonding surfaces 236, 238, surface 226 (frit 230) of sheet 222, and the inner wall 240 of arciform body 234 form a gas-filled chamber or bulb 239. Chamber 239 may be in fluid communication with the exterior through one or more perforations (not shown) extending through body 234 to allow the body to be compressed and form a tight seal. Instead of a gas-filled chamber providing the sealing force, it is found that the memory of the gasket, and cross-sectional profile are often sufficient to accomplish the seal.

Figure 8:
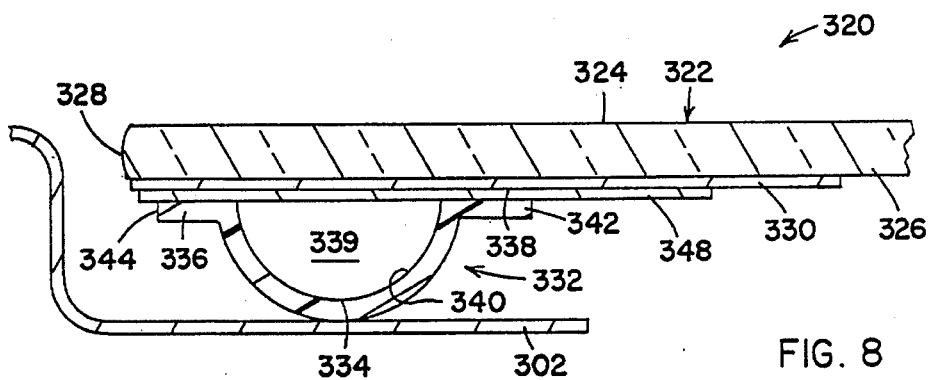
FIG. 8 is a fragmentary section of another embodiment of a panel assembly that may be used in FIG. 1.

In FIG. 8, a flush-mounted panel assembly 320 includes a sheet-like panel 322 having substantially parallel surfaces 324, 326 terminating in a peripheral edge 328. Bonded to frit layer 330 on surface 326, using any one of the above-described techniques, is an arciform gasket 332 having a bulbous body 334 terminating at its base in securing flanges 342 and 344. Flanges 342, 344 are preferably, but not necessarily parallel to surface 326, co-planar with each other, and extend in opposite directions in order to bond with surface 326. Just as in the previous embodiment shown in FIG. 7, flanges 342, 344 and body 334 may have constant or gradational thicknesses depending upon the desired function. For example, arciform body wall 340 defining chamber 339 may be thinner than one or both flanges 342, 344.

Figure 9:
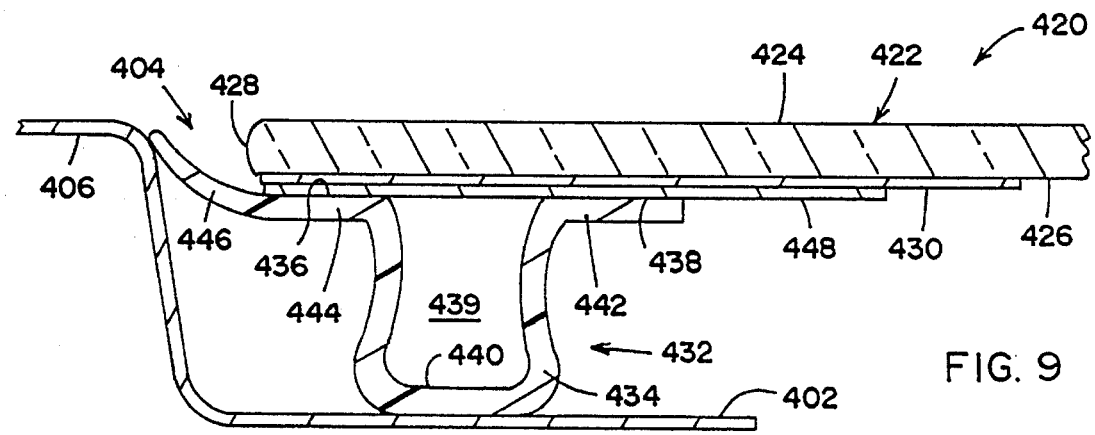
FIG. 9 is a fragmentary section view of yet another embodiment of a panel assembly for use in movable panels.

In FIG. 9, flush-mounted panel assembly 420 includes a sheet-like panel 422 having opposing surfaces 424 and 426 and a peripheral edge 428. Frit layer 430 on sheet or panel 422 is bonded, using any one of the above methods, to gasket 432 adapted to space sheet 422 from pinch flange 402, as well as seal gap 404 between sheet metal 406 and peripheral edge 428. Gasket 432 includes an arciform body 434 terminating in securing flange 442 at one end and a second securing flange 444 at an opposite end. Securing flange 444 extends laterally away from arciform body 434 and beyond peripheral edge 428 of sheet 422 to form a lip 446. When assembly 420 is disposed within the opening defined by pinch flange 402 such that arciform body 434 engages pinch flange 402, and when assembly 420 is properly centered therein, lip 446 at the end of securing flange 444 drags across sheet metal 406 and barricades gap 404, forming a seal therein. With panel assembly 420 properly located within the vehicle opening defined by pinch flange 402, outer surface 424 of panel 422 is substantially flush with the surface defined by sheet metal 406. Panel assembly 420 provides a more aerodynamic fit and style producing less wind noise than conventional mounting techniques. A further advantage associated with this assembly, as well as those described below, is the relative ease of assembly.

Figure 10:
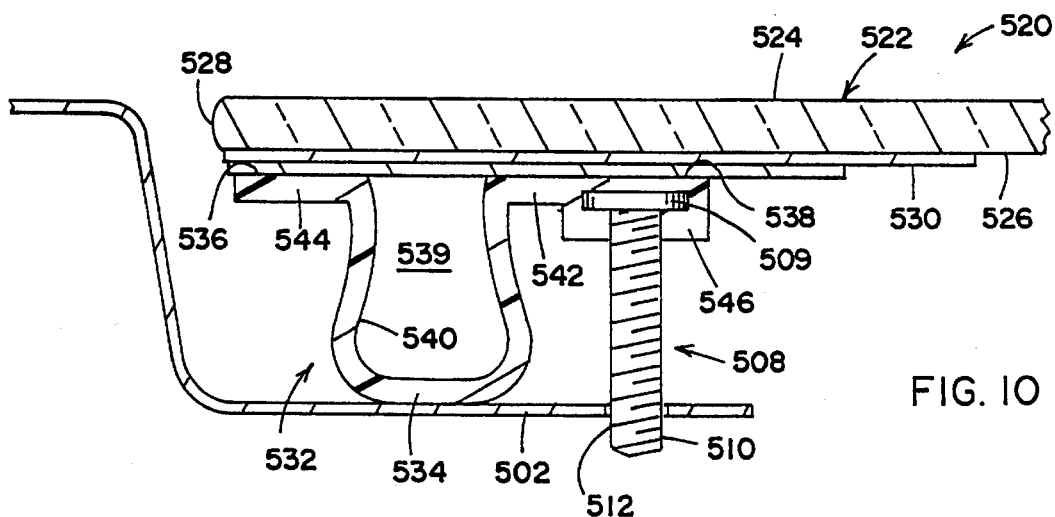
FIG. 10 is a fragmentary section view of still another embodiment of a panel assembly made in accordance with the method.

FIG. 10 illustrates an embodiment 520 of the panel assembly wherein surface 526 and/or frit layer 530 is bonded to an arciform gasket 532. Gasket 532 has an arciform body 534 terminating in securing flanges 542, 544 to define a gas-filled chamber 539. Securing flange 542 has an extended thickened portion 546 inboard of body 534 in which a stud 508 has a head 509 captured during molding. Shank 510 of stud 508 is adapted to be received or extend through a hole 512 formed in pinch flange 502. Arciform or bulbous body 534 acts both as a spacer and as a cushion for panel 522 when assembly 520 is disposed within the opening. Assembly 520 may also be aided in its positioning within the opening defined by pinch flange 502 by locating shaft 510 in hole 512. A threaded nut or pressure cap may retain stud 508 in hole 512 from an opposite side of pinch flange 502. Assembly 520, like the other embodiments, may also be retained within the opening by a suitable adhesive disposed between the sheet and/or gasket and pinch flange. The type of adhesive may vary depending upon the particular needs of the automobile assembler. One common type of adhesive is known as BETASEAL, produced by Essex Chemical Corporation of Sayerville, N.J. The BETASEAL brand adhesive is designed to provide a secure bond between a glass panel and a sheet metal surface typically encountered in vehicle window assemblies.

Panel assembly 620 (FIG. 11), for use on Class "A" surfaces such as vehicle windshields, includes a sheet-like panel 622 of glass which may be laminated, tempered or otherwise strengthened and has a predetermined size and geometry. An outer surface 624 is bonded to a spacer/gap seal 626 using any one of the methods described above. Combination spacer/gap seal 626 has a generally arcuate upper profile 628 which extends away from sheet 622 and is generally parallel to surface 624. The extension of seal 626 forms a resilient, flexible lip 630 which engages sheet metal 632 to seal the gap between the peripheral edge 634 of sheet 622 and sheet metal 632. Extending perpendicularly from the lower surface of seal 626 is a generally rigid flange 636 adapted to space sheet 622 a predetermined distance from pinch flange 638. Assembly 620 is retained within the opening defined by pinch flange 638 by a bead of BETASEAL or other suitable adhesive 640 bonding panel 622 to pinch flange 638.

Although each of the above embodiments of the gasket bonded to the sheet or panel have been described generally as made from a polymeric material, it is preferred that PVC be used. Because PVC offers several advantages over other materials including ease in handling, it is readily available, inexpensive and recyclable. Moreover, PVC material is substantially resistant to ultraviolet radiation and is substantially flexible and resilient in a variety of climatic conditions. Although PVC is preferred, a modified PVC blend or other material having favorable compression set properties may also be used including RIM urethane and thermoplastic elastomers.

The above method of forming the gaskets and bonding them to the sheet-like panels offers several distinct advantages including changing cross sections and unusual or complex profiles for a particular panel depending upon specific design aspects such as disclosed in FIG. 1. Moreover, based upon the potential range of applications of the above panel assemblies, the Durometer hardness of the material may vary. For example, a Durometer hardness within the range of 55 to 90 will be sufficient for many applications. But where it is desired for one portion of the gasket to be flexible while another portion is stiff, a low Durometer material may be used with a material build-up used to create the stiff or harder portion of the gasket.

Figure 12:
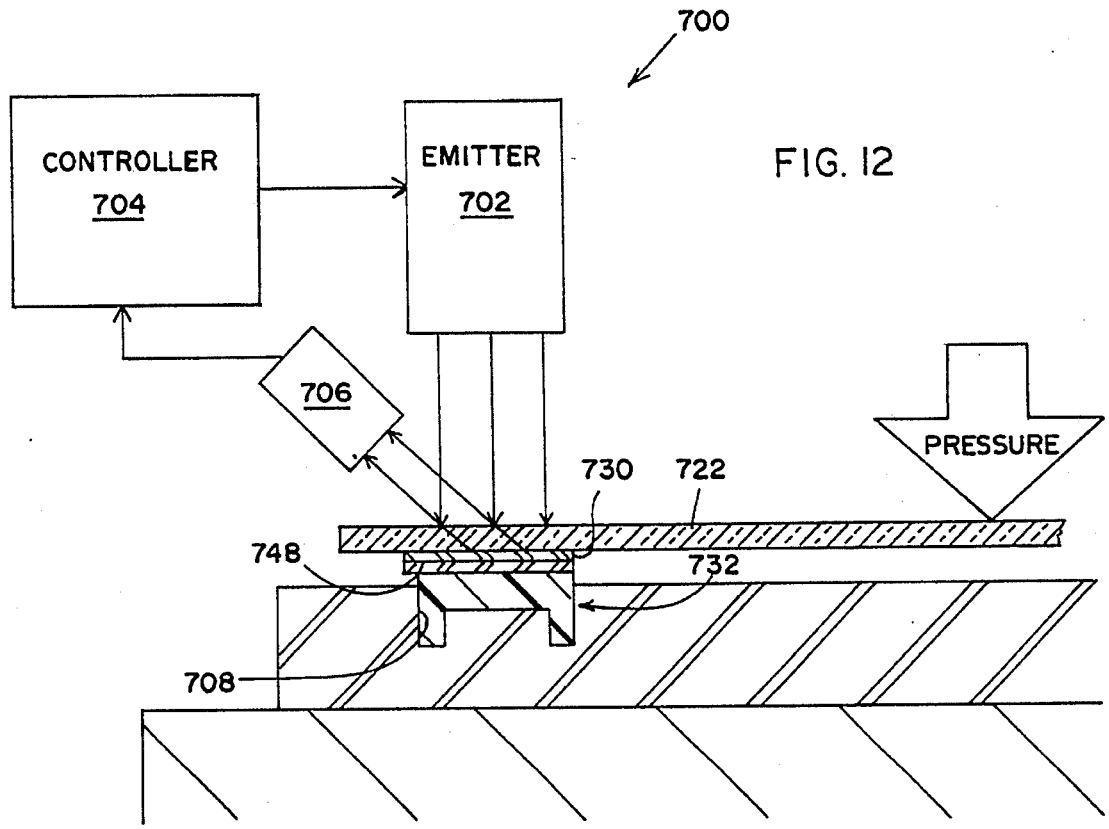
FIGS. 12 and 13 illustrate two examples of energy sources used in the method.
Figure 13:
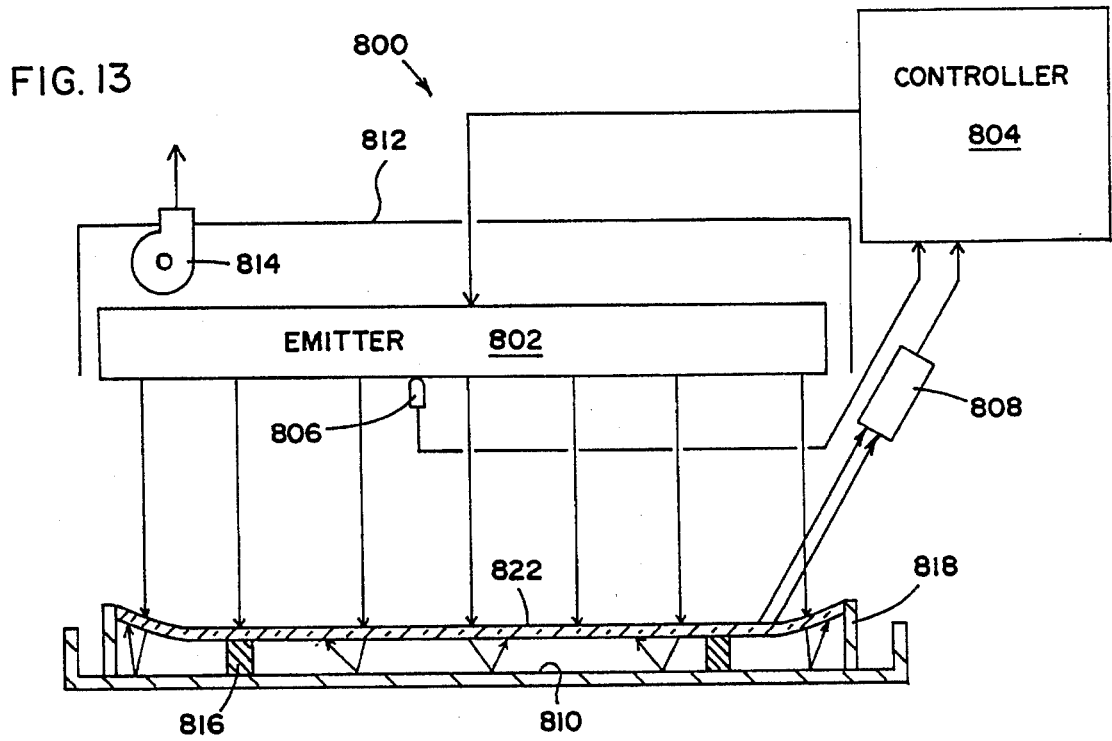

FIGS. 12 and 13 are schematic representations of two energy sources mentioned above that may be used to heat the frit layer and/or contact boundary between a panel such as 22 and a gasket such as 32 described above in relation to FIG. 2. Although each source is described in relation to producing a characteristic energy spectrum, such is by way of example only. Other energy sources may be equally effective in heating the frit layer/contact boundary such as convective, conductive, inductive and resistive heat sources. Moreover, microwave energy may be used as well.

FIG. 12 generally illustrates a controlled, focused infrared (CFIR) source 700 which may be used in both the preheating of the sheet prior to receiving the gasket, as well as heating with or without the application of pressure after the sheet and gasket contact each other.

CFIR 700 includes one or more infrared emitter assemblies 702 such as Model 5305-104 made by Radiant Energy Research, Inc. of Minneapolis, Minn., and disposed above sheet 722 in a pattern conforming to that region of sheet 722 adapted to receive gasket 732. In the alternative, a single infrared emitter assembly may be moved above sheet 722 by a guided robotic arm in a pattern conforming to that area to receive gasket 732. Computer/process controller 704 preferably causes infrared emitter assembly 702 to emit infrared energy into sheet 722 from a side opposite that containing frit coating 730 and primer coating 748 although it may also be directed from the same side as the frit layer 730 and primer 748. A spectrophotometer 706 coupled to computer/process controller 704, detects the energy reflected and radiated from sheet 722. Based upon the feedback from spectrophotometer 706, controller 704 adjusts the power of infrared energy emitted by assembly 702 to obtain maximum absorption by frit layer 730 and primer 748 and raise the temperature level to between 100° F. and 350° F. Although CFIR 700 has been described for use in both heating steps, it is contemplated that it will be most effective to heat the frit layer/contact boundary after the gasket is located with respect to the sheet.

FIG. 13, schematically illustrating a controlled area infrared (CAIR) source 800, may include one or more infrared emitters 802 such as Model FB122425B3 made by Casso-Solar Corp., of Pomona, N.Y., and may be distributed above and aligned with sheet 822. Radiation generated by emitter 802 is controlled by a controller 804 based upon input from a thermocouple 806 attached to emitter 802, and a spectrophotometer 808 angularly disposed with respect to sheet 822. A reflector 810 may be disposed beneath sheet 822 to reflect heat energy back into the sheet. Sheet 822 may be supported above reflector 810 by insulator blocks or spacers 816 to prevent heat loss by conduction into reflector 810. Contemplated in both of the heating options, but shown only in FIG. 13, is a plenum 812 and exhaust fan 814, to vent fumes driven off during the heating process. Moreover, each sheet may be properly located with respect to each heating source by using a template or guide for either the panel or sheet such as 818 or gasket (708 in FIG. 12).

Since the radiation produced by emitter 702 preferably is introduced into sheet 722 from a side opposite that containing primer coating 748, it is preferred that sheet 722 have a high transmissivity to the wavelength of radiation selected. Emitters 702 and 802 both are capable of producing infrared radiation having a wavelength greater than $7.0 \times 10^3$ Angstroms (A). The transmissivity of the radiation through each sheet is greatly affected by its particular characteristics. For example, tinted or opaque panels may have a lower transmissivity since the pigments or coloration within the material may absorb a portion of the radiation. For materials having lower transmissivities, it is preferred to select wave lengths of radiation which promulgate better through the materials, yet are absorbed by the frit layer at the contact boundary between the sheet and primer coating. In the preferred embodiment of this invention, sheets 22 are glass sheets and may be single sheets or laminated sheets, depending on the desired function in the vehicle.

In order to reduce problems associated with heating and cooling large expanses of glass or plastic panels, it is preferred that each of the above radiation sources direct their energy to an areally restricted portion of the panel or sheet. For example, since it is desired to heat only that portion of the sheet adapted to engage the gasket, each energy source 702, 802 may be adapted so that the radiation is applied only to the peripheral margin or other location receiving the gasket. Alternatively, each source may be moved around the sheet by a guided robotic arm, as mentioned above or a mask may be used to limit the exposed area. Moreover, one or more emitters such as 702, 802 may be recessed within a tool patterned to coincide with the area of the panel to be heated.

Figure 14:
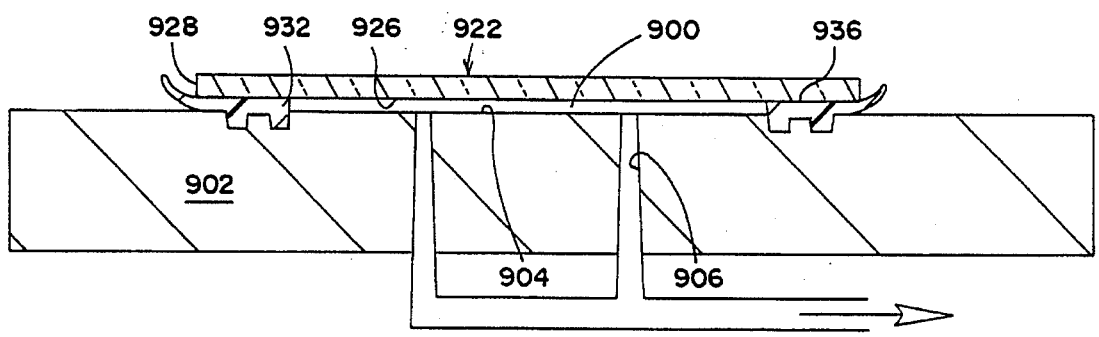
FIGS. 14–15 generally illustrate alternate pressure application techniques between the gasket and sheet-like panel used in the method.
Figure 15:
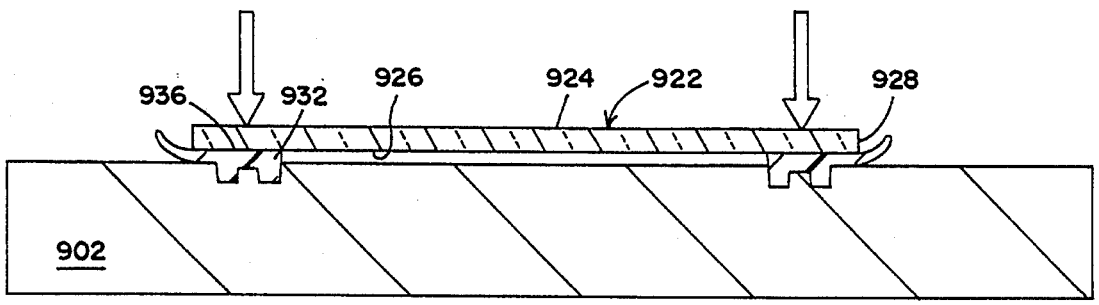

FIGS. 14–15 illustrate two techniques for forcing each sheet into contact with each gasket. Preferably, one method and apparatus (FIG. 14) includes the creation of a negative pressure or vacuum within chamber 900 formed by the inside perimeter of gasket 932 within tool half or fixture 902, surface 926 of sheet 922 and surface 904 of tool 902. Suction lines 906 extending through tool 902 are coupled to a vacuum source (not shown). The vacuum created in chamber 90 causes sheet 922 to be forced downwardly by atmospheric pressure against bonding surface 936 of gasket 932.

An alternate method and apparatus (FIG. 15) of forcing sheet 922 into contact with gasket 932 is by the mechanical application of pressure or force on sheet surface 924 substantially opposite surface 926 receiving gasket 932. It is contemplated that a variety of mechanisms may be used to exert the force, pushing the sheet and gasket together, including rams, either hydraulic or pneumatic, associated with the opposite tool half, a panel carrier, robotic arm and the like. In one method, the sheet and gasket are forced against each other in the molding tool such as 50, 50A described above by the tool half not retaining the gasket. Pressure feet or pads may be located between surface 924 and the opposite tool half such as 62 in order to precisely locate the force on surface 924.

As briefly outlined above, a variety of mechanisms exist for placing sheet 22 into intimate contact with the bonding surface of gasket 30. It is contemplated by this invention that the location of gasket 30 and sheet 22 may be reversed to obtain substantially the same results.

Although the invention has been described with respect to specific preferred embodiments thereof, many variations and modifications will become apparent to those skilled in the art. It is, therefore, the intention that the appended claims be interpreted as broadly as possible in view of the prior art to include all such variations and modifications.

The embodiments of the invention in which an exclusive property or privilege is claimed are defined as follows:

1. A panel assembly comprising:
   a panel having first and second surfaces and a peripheral edge;
   a gasket formed separately from said panel and having an arciform body; and
   a heat-activated primer composition between said panel and said gasket for bonding said arciform gasket to a single surface of said panel.

2. A panel assembly as recited in claim 1, further including a frit layer deposited between said gasket and said panel.

3. A panel assembly as recited in claim 2, further comprising first and second securing flanges spaced apart from each other and extending from said gasket and having portions adapted to engage said panel.

4. A panel assembly as recited in claim 3, wherein said arciform body and first and second securing flanges cooperate with said panel to form a chamber.

5. A panel assembly as recited in claim 4, wherein said first securing flange defines a lip seal extending outwardly from said gasket and beyond said peripheral edge.

6. A panel assembly as recited in claim 5, further comprising
   a fastener molded within and captured by said second securing flange for mechanically fastening said panel assembly in an opening.

7. A panel assembly as recited in claim 4, further comprising a lip seal formed separately from said panel and extending from said gasket beyond said peripheral edge of said panel and adapted to engage a surface of said panel adjacent said gasket.

8. A panel assembly as recited in claim 1, wherein said panel is glass;
   said gasket formed from a polymeric material and bonded to said first surface of said panel;
   a frit layer attached to said first surface; and
   said primer composition coating at least a portion said frit layer.

9. A panel assembly, comprising:
   a panel having first and second surfaces terminating in a peripheral edge;
   a gasket formed separately from said panel and having an arciform body and first and second securing flanges spaced apart from each other and adapted to engage said panel;
   a heat-activated primer for attaching said first and second securing flanges to said panel; and
   wherein said arciform body, panel, and first and second securing flanges cooperate to form a chamber.

10. A panel assembly as recited in claim 9, wherein said gasket is preformed from a polymeric material.

11. A panel assembly for use in a vehicle opening comprising:
    panel of size and geometry adapted to fit in the vehicle opening, said panel having first and second surfaces, each terminating in a common peripheral edge;
    a first polymeric gasket formed separate from said panel and adapted to engage at least a portion of said panel along said first surface proximate said peripheral edge;
    a second polymeric gasket formed separate from said panel and adapted to engage at least a portion of said panel along said second surface; and
    a primer for bonding said first and second gaskets to said first and second surfaces of said panel.

12. A panel assembly as recited in claim 11, wherein said first gasket includes:

a first and second securing flanges each having a bonding surface secured to said panel; and an arciform body interconnecting said first and second securing flange, said arciform body having an inner wall, together with said panel, defining a gas filled chamber.

13. A panel assembly as recited in claim 12, wherein said first securing flange defines a lip seal extending beyond the peripheral edge of said panel for engaging the vehicle.

14. A panel assembly as recited in claim 13, wherein said first gasket is formed about and captures a fastener for locating said panel in the vehicle opening.

15. A panel assembly as recited in claim 11, wherein said second gasket includes a seal having a flexible, resilient lip projecting beyond the peripheral edge of said panel from said second panel surface.

16. A panel assembly as recited in claim 11, including a frit layer on at least one of said first and second panel surfaces between said panel and at least on of said gaskets.

17. A panel assembly, comprising:

a panel having a first and second surfaces terminating in a peripheral edge; a frit layer on said first surface of said panel proximate said peripheral edge;

a gasket having an arciform body and first and second securing flanges spaced apart from each other and adapted to engage said panel to form a chamber; and a heat-activatable adhesion promoting primer on at least one of said panel and said gasket for bonding said gasket to said panel.

* * * * *

UNITED STATES PATENT AND TRADEMARK OFFICE
CERTIFICATE OF CORRECTION

PATENT NO.   : 5,591,528
DATED        : January 7, 1997
INVENTOR(S)  : Fisher et al.

It is certified that error appears in the above-identified patent and that said Letters Patent is hereby corrected as shown below:

Column 14, line 36:
    Before "said" (second occurrence), insert --of--.

Column 14, line 53:
    Before "panel" insert --a--.

Column 14, line 62:
    Before "bonding" delete "for".

Signed and Sealed this

Seventeenth Day of April, 2001

Attest:

NICHOLAS P. GODICI

*Attesting Officer*       *Acting Director of the United States Patent and Trademark Office*